US009224146B2

(12) United States Patent
Hayhow (10) Patent No.: US 9,224,146 B2
(45) Date of Patent: Dec. 29, 2015

(54) APPARATUS AND METHOD FOR POINT OF SALE TERMINAL FRAUD DETECTION (75) Inventor: Robert Hayhow, Burlington (CA)

(73) Assignee: THE TORONTO DOMINION BANK, Toronoto, ON (CA)

( * ) Notice: Subject to any disclaimer, the term of this patent is extended or adjusted under 35 U.S.C. 154(b) by 851 days.

(21) Appl. No.: 12/588,017

(22) Filed: Sep. 30, 2009

(65) Prior Publication Data

US 2011/0078034 A1    Mar. 31, 2011

(51) Int. Cl.
*G06Q 20/40* (2012.01)
*G06Q 20/20* (2012.01)

(52) U.S. Cl.
CPC ............ *G06Q 20/4016* (2013.01); *G06Q 20/20* (2013.01); *G06Q 20/202* (2013.01)

(58) Field of Classification Search
CPC ............................... G06Q 20/40; G06Q 20/20
USPC ......................................................... 380/247
See application file for complete search history.

(56) References Cited

U.S. PATENT DOCUMENTS

| 6,311,165 | B1 | 10/2001 | Coutts |
| 6,827,260 | B2* | 12/2004 | Stoutenburg et al. ......... 235/380 |
| 7,219,833 | B2 | 5/2007 | Cantini et al. |
| 7,232,063 | B2 | 6/2007 | Fandel et al. |
| 7,293,709 | B2* | 11/2007 | Baker et al. .................. 235/437 |
| 7,472,394 | B1 | 12/2008 | Meckenstock et al. |
| 2002/0186845 | A1* | 12/2002 | Dutta et al. .................. 380/247 |
| 2003/0167237 | A1 | 9/2003 | Degen et al. |

OTHER PUBLICATIONS

Canadian Office Action for corresponding Canadian patent application No. 2,681,226, mailed on Oct. 15, 2014.

* cited by examiner

*Primary Examiner* — Shay S Glass (57) ABSTRACT

A system, apparatus, method and computer programming for monitoring security of a payment terminal is described. There is provided monitoring of one or more security parameters associated with the payment terminal; detecting any violation of any one of the security parameters; classifying the detected any violation of the one or more of the security parameters into a classification; transmitting data regarding the any violation of the one or more of the security parameters, including the classification thereof, to a centralized terminal management server. If the any detected violation of the one or more of the security parameters is classified as potential fraudulent activity, there is also provided one or more security actions in response to the any detected violation of the one or more of the security parameters.

23 Claims, 11 Drawing Sheets

Online Reporting

Device Security

Event type:  All events ▶

Error type:  All ▶

Start Date:  June ▶  1 ▶  2009 ▶

End Date:  June ▶  17 ▶  2009 ▶

Help
Print this page

- Reports
- ▲ Transaction Search
- ▲ Exception Reports
- ▲ Device Security Report
  - ▲ Device Security
  - ▲ Device Inventory
- ▲ Monthly Statement
- ▲ Loyalty
- ▲ User Management
- ▲ My Profile
- ▲ Point of Sale Terminals & Solutions
- ▲ Contact Newsletter
- ▲ Account Information Security

Reports
Security Report                                   Help

Print this page 200-021110825                              Starting: Jun 1, 2009
ET TEST MERCHANT                           Ending: Jun 17, 2009

| TERMINAL | INCIDENT COUNT |
|---|---|
| FS2111082501 | 5 |
| FL2111082501 | 0 |
| FL2111082549 | 0 |
| J2111082500​1 | 0 |
| J2111082500​2 | 0 |
| N2111082500​1 | 0 |
| N2111082500​2 | 0 |
| N2111082599​9 | 0 |
| NONE | 0 |
| NONE2 | 0 |
| W2111082500​2 | 0 |
| W9211108250​1 | 0 |
| n2111082500​3 | 0 |
| p2111082500​1 | 0 |
| TERMINAL | INCIDENT COUNT |

- Reports
- Transaction Search
- Exception Reports
- Device Security Report
  ▸ Device Security
  ▸ Device Inventory
- Monthly Statement
- Loyalty
- User Management
- My Profile
- Point of Sale
- Terminals & Solutions
- Contact Newsletter
- Account Information
- Security

FIG. 11

| Reports | | | Help |
|---|---|---|---|
| Security Report | | | Print this page |
| 200-021110825 | | | Starting: Jun 1, 2009 |
| ET TEST MERCHANT | | | Ending: Jun 17, 2009 |
| Terminal:FS2111082501 | | | |
| Event name | Started | Ended | |
| Power off/on | 2009/06/09-09:58:11 | 2009/06/10-18:14:16 | |
| Power off/on | 2009/06/09-15:08:39 | 2009/06/10-09:12:42 | |
| Power off/on | 2009/06/10-18:14:39 | 2009/06/11-14:43:52 | |
| Pinpad disconnect | 2009/06/09-09:35:18 | 2009/06/09-09:35:56 | |
| Pinpad disconnect | 2009/06/09-09:43:42 | 2009/06/09-09:44:22 | |
| Event name | Started | Ended | |

[Export] to: Adobe Acrobat (PDF) ▶

- Reports
- Transaction Search
- Exception Reports
- Device Security Report
  ▸ Device Security
  ▸ Device Inventory
- Monthly Statement
- Loyalty
- User Management
- My Profile
- Point of Sale
- Terminals & Solutions
- Contact Newsletter
- Account Information Security

FIG. 12

APPARATUS AND METHOD FOR POINT OF SALE TERMINAL FRAUD DETECTION

FIELD

The embodiments described herein relate generally to point of sale terminals, and more specifically to methods and apparatus for monitoring point of sale terminals to attempt to detect when the point of sale terminals have been tampered with.

BACKGROUND

Point of sale (POS) terminals enable merchants to receive payments from customers using a variety of payment methods such as credit cards, debit cards, smart cards, and gift cards, which are referred to herein as transaction cards. The use of POS terminals allows the customer the option of choosing a payment method that suits them, and as a result POS terminals are found at almost all merchant establishments.

Along with the increased deployment of POS terminals has come an increase in the theft of transaction card data. Through use of the merchant's payment system, thieves may attempt to replace a legitimate POS terminal, whether bank issued or otherwise, with a dummy device that can read and store transaction card data (including card numbers, and any authentication information entered by the users, names, etc.) from unsuspecting customers and without knowledge of the merchant. After a period of time has elapsed the dummy device can store considerable amounts of transaction card data and the dummy device may then be removed and replaced with the legitimate POS device. The data that is stored upon the dummy device can then be used to perform fraudulent transactions through use of the unsuspecting customer's account information. Where the thieves have not resorted to employing a dummy device in the merchant's system, the legitimate POS terminal is often modified or compromised by thieves to allow the transaction card data to be diverted to added storage devices which may then be subsequently retrieved and used for fraudulent purposes. Due to attempts made to compromise terminals and steal transaction card data, there is a need for a system and method for determining payment terminal fraud detection.

SUMMARY

In an aspect of the invention, there is a method for monitoring security of a payment terminal. The method comprises monitoring one or more security parameters associated with the payment terminal; detecting any violation of any one of the security parameters, classifying the detected any violation of the one or more of the security parameters into a classification; transmitting data regarding the any violation of the one or more of the security parameters, including the classification thereof, to a centralized terminal management server; and wherein if the any detected violation of the one or more of the security parameters is classified as potential fraudulent activity, providing one or more security actions in response to the any detected violation of the one or more of the security parameters.

The one or more security parameters may include a power status of the payment terminal, the detecting any violation of the any one of the security parameters may include detecting an interruption to the power status of the payment terminal, and the interruption to the power status may be classified as potential fraudulent activity. The one or more security parameters may include a network connectivity status of the payment terminal, the detecting any violation of the any one of the security parameters may include detecting an interruption to the network connectivity status of the payment terminal, and the interruption to the network connectivity may be classified as potential fraudulent activity. The one or more security parameters may include monitoring an access opening to the interior components of the payment terminal, the detecting of any violation of the any one of the security parameters may include detecting an intrusion to the payment terminal through the access opening, and the intrusion may be classified as potential fraudulent activity.

The one or more security actions may include providing a notice of the detected any violation. The one or more security actions may include disabling the payment terminal. The disabling the payment terminal may be in response to a command received from the centralized terminal management server. The notice of the detected any violation may be provided by at least one of an electronic mail or a SMS message to one or more recipients. The notice may be generated at and sent from the centralized terminal management server to the one or more recipients.

In another aspect of the present invention, there is a method for processing security event data of a payment terminal. The method comprises receiving the security event data indicative of a security violation of the payment terminal; classifying the security violation to determine whether the payment terminal is to be deactivated; sending a command to the payment terminal for deactivation so as to discontinue processing of transactions based on the classification of security violation as indicating the payment terminal is to be deactivated.

The security event data may be indicative of at least one of a disconnection of the payment terminal from its power supply, a disconnection of the payment terminal from its network connection, or a removal of one or more components from the payment terminal as the security violation.

The method may comprise providing a notification of the security violation. The notification of the security violation may be provided by at least one of an electronic mail or a SMS message to one or more recipients. The notification may be generated at and sent from a centralized terminal management server in communication with the payment terminal.

In yet another aspect of the present invention, there is a centralized terminal management server for processing security event data of a payment terminal. The server comprises a data transceiver to receive the security event data indicative of a security violation of a payment terminal in communication with the centralized terminal management server; a data processor in communication with the data transceiver to classify the security violation to determine whether the payment terminal is to be deactivated, and if so, the data processor causing the data transceiver to send a command to the payment terminal for deactivation so as to discontinue processing of transactions based on the classification of security violation as indicating the payment terminal is to be deactivated.

The security event data may be indicative of at least one of a disconnection of the payment terminal from its power supply as the security violation, a disconnection of the payment terminal from its network connection as the security violation or a removal of one or more components from the payment terminal as the security violation.

Upon the data processor determining the payment terminal is to be deactivated, the data processor may cause the data transceiver to generate and send a notification of the security violation, and the notification of the security violation may be provided by at least one of an electronic mail or a SMS message to one or more recipients.

The server may comprise a data storage medium in communication with the data processor, and the received security event data and the classification thereof may be stored at the data storage medium.

In other aspects, computer programming and other apparatus, systems and methods are provided to achieve the above and other aspects to the invention.

BRIEF DESCRIPTION OF THE DRAWING FIGURES

For a better understanding of the present invention and to show more clearly how it may be carried into effect, reference will now be made, by way of example, to the accompanying drawings, which show a preferred embodiment of the present invention and in which.

DETAILED DESCRIPTION OF THE PREFERRED EMBODIMENT

It will be appreciated that, numerous specific details have provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

The embodiments of the apparatus, systems and methods described herein may be implemented in hardware or software, or a combination of both. Furthermore, the system, processes and methods of the described embodiments are capable of being distributed as computer programming in a computer program product comprising a computer readable medium that bears computer usable instructions for execution on one or more processors.

The description which follows, and the embodiments described therein, are provided for illustration by way of an example, or examples, of particular embodiments of the principles of the present invention. These principles are provided for purposes of explanation, and not limitation of those principles, and of the invention.

Figure 1:
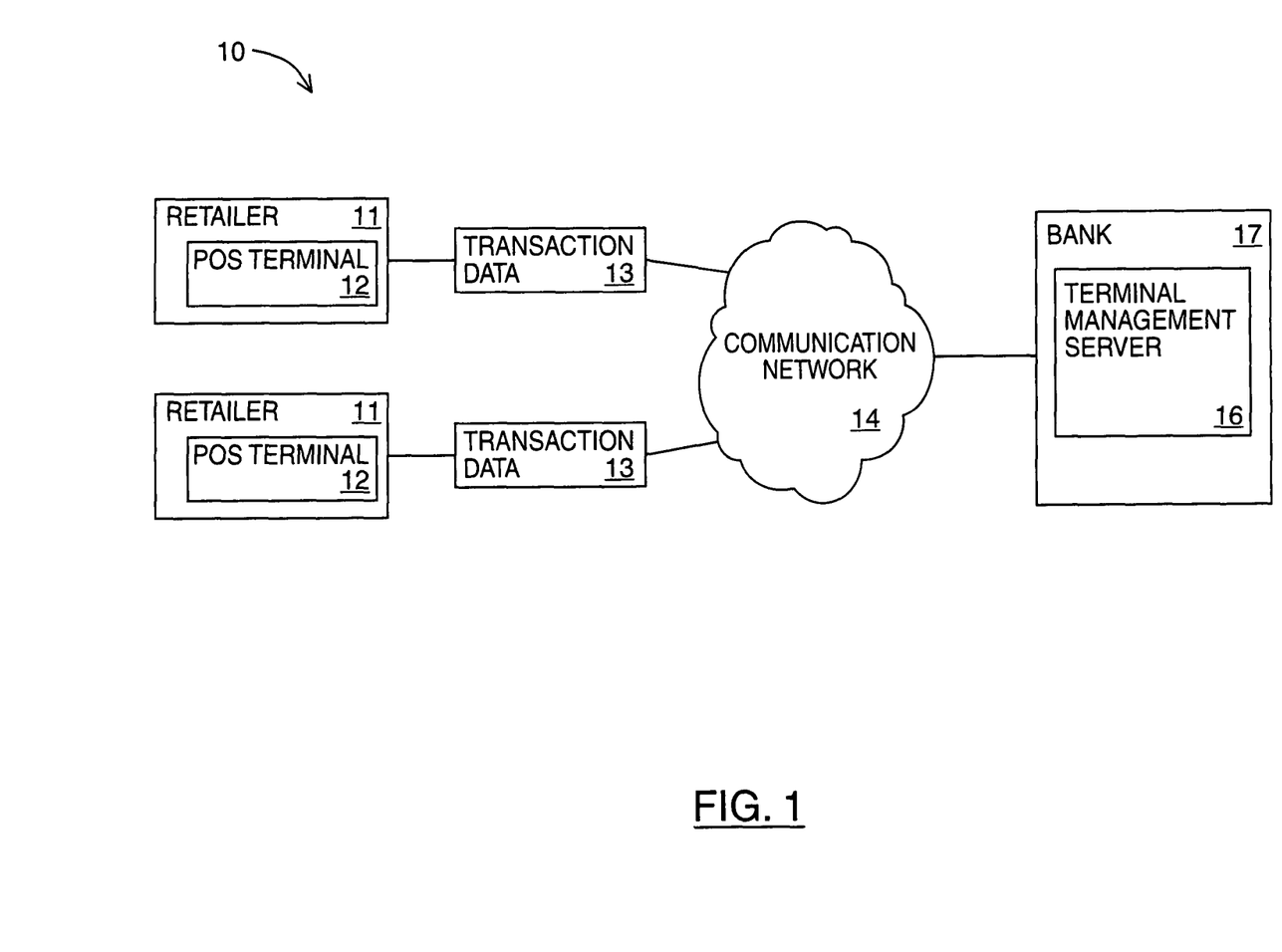
FIG. 1 is a block diagram of the components of a payment terminal system.

The embodiments described herein, as will be more fully understood with the accompanying description, relate to methods and systems for monitoring point of sale terminals for detecting fraudulent activity, and thus tending to reduce and deter theft of transaction card data. The term transaction card data as used herein is used to refer to specific information that is contained or associated with transaction cards and includes, but is not limited to, account numbers, expiry dates, names, pins, track one, track two, chip data or other authentication information. The POS terminals described herein are provided to a merchant or retailer by an issuing authority which for purposes of this description is referred to as a bank. An issuing authority can be an intermediary service provider or other payment processing provider or service. Reference is made now to FIG. 1, where a block diagram illustrating the components of a fraud detection system 10 is shown in an exemplary embodiment. The fraud detection system 10 in this exemplary embodiment is comprised of one or more POS terminals 12 that are associated with a retailer 11, where the POS terminals 12 generates transaction data 13 that is transmitted through a communication network 14 to a terminal management server 16. One or more communication devices 18 can be used to access the terminal management server 16 to set parameters related to the operation of the system 10 as explained in detail below, and to view reports and alerts regarding the POS terminals 12. The fraud detection system 10, as explained in further detail below, monitors the status of the member POS terminals 12 with regards to one or more security parameters. The security parameters are monitored to detect if a POS terminals 12 is compromised, such as where either a terminal 12 is being removed from operation or an attempt to remove is made, or where malicious code or devices are being installed upon a terminal. The security parameters can measure whether any component of the POS terminals are removed, or deactivated or where a connection that the POS terminal requires has been removed. The security parameters may include, but are not limited to, the removal of network connectivity from the terminal, the loss of power to the terminal, the removal of any internal component of the terminal 12 (including but not limited to IC boards, circuits, batteries, screens), and/or the opening of access doors or other tampering of the external casing for the terminal 12.

The POS terminals 12 transmit transaction data 13 to a terminal management server 16 through communication network 14. The transaction data 13 may be any data that is generated by the POS terminal based on a transaction and includes any data that is used specifically by the system 10 when attempting to determine whether the terminal may have been tampered with. The communication network 14 in an exemplary embodiment is the Internet. Proprietary or private networks can also be used. Communication over the network 14 can be encrypted, provided over a virtual private network, or otherwise secured. The communication network 14 receives data from the POS terminal 12 and transmits it to terminal management server 16. The terminal management server 16 receives data and processes the data from the POS terminals 12. In and embodiment, the terminal management server 16 receives the transaction data 13 and allows the merchants to view the security parameter related data, and also processes the data so that the POS terminal 12 may be disabled where it is suspected that the POS terminal has been compromised. The components of the terminal management server 16 are described in further detail below with regards to FIG. 4. Communication device 18 can allow users of the system 10 to access reports and receive alerts from the terminal management server 16. The communication devices, including device 18, may be any computing devices that have network capabilities, including, but not limited to desktop, laptop computers, handheld devices, and mobile devices. For example, where the terminal management server 16 and its on board processing suspects that a terminal has been compromised, the merchant may receive electronic notification of such suspicious activity where they may then investigate further. Electronic notification may be provided through use of an electronic mail message, SMS or automated phone call.

Figure 2A:
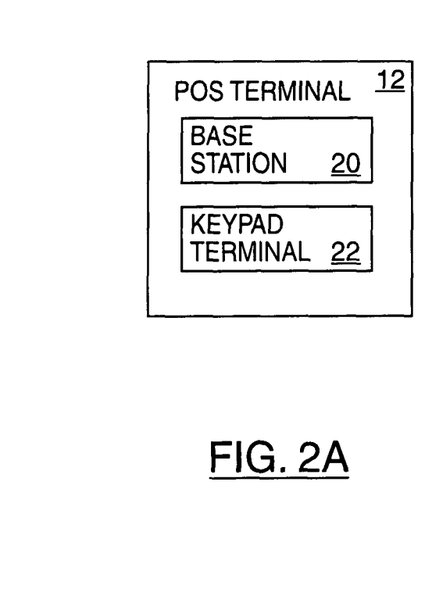
FIG. 2a is a block diagram of the components of point of sale terminal.
Figure 2B:
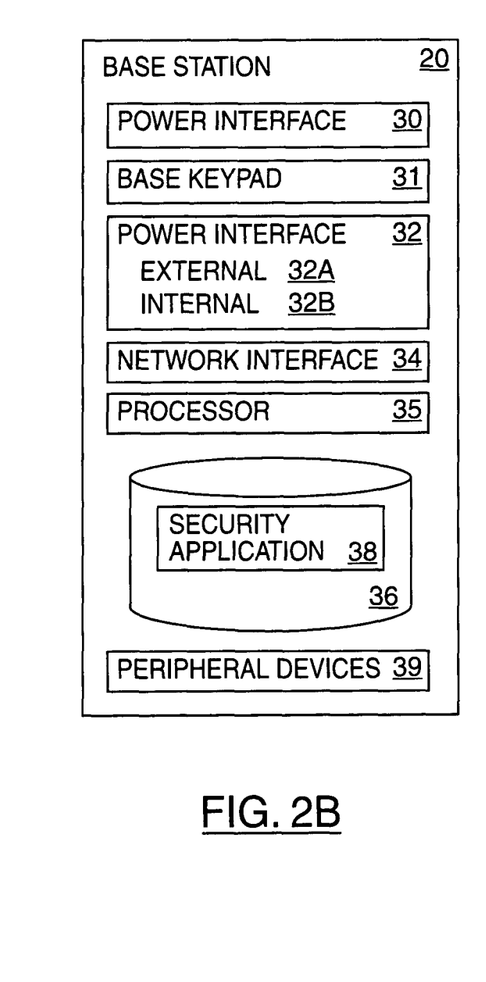
FIG. 2b is a block diagram of the components of the base station of a point of sale terminal.
Figure 2C:
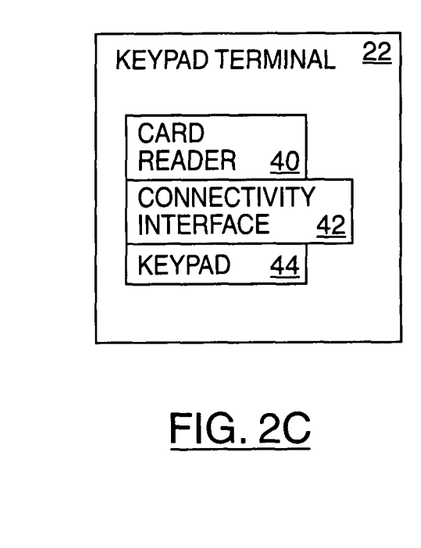
FIG. 2c is a block diagram of the components of the key pad terminal of a point of same terminal.

Reference is now made to FIG. 2A-2C, where the POS terminals 12 are described in greater detail. Reference is now made to FIG. 2A where a block diagram illustrating the components of the POS terminal 12 in one embodiment is shown. In one embodiment, the POS terminals 12 comprise a base station 20 and a keypad terminal 22. Where the POS terminals comprise both a base station 20 and a keypad terminal 22, the base station 20 is used by the merchant to enter the relevant transaction information and the keypad terminal 22 is then used by the customer to confirm the transaction by entering appropriate authentication information (i.e., a PIN number). It will be understood by one of skill in the art, that the POS terminal 12 may also be comprised of one unit with the functions of the base terminal 20 and keypad terminal 22 combined in one unit, as appropriate.

Reference is now made to FIG. 2B where the components of the base station 20 are shown in an exemplary embodiment. The base station 20, in an exemplary embodiment comprises a card reader 30, a base station keypad 31 a power interface 32, a network interface 34, a processor 35, a memory store 36 which has resident upon it or associated with it a security application 38. The base station 20 may also have one or more peripheral devices 39.

The card reader 30 allows the information imprinted on transaction cards to be read by the POS terminal 12. In embodiments, multiple card readers or a multi-function reader can be provided, such as for reading magnetic stripes, integrated chips, or for reading radio-frequency or other wireless information from a transaction card. The base station keypad 31 allows the merchant to enter the transaction information along with providing other input that may be required by the POS terminal 12. In some embodiments, the base station can also be used by a customer of the merchant providing the transaction card to enter information, such as to authenticate a purchase (especially in embodiments in which there is no separate keypad terminal 22). The power interface 32 may comprises an external power input 32A, and an internal power output 32B. The external power input 32A allows for the base station 20 to be connected to an external power source. The Internal power output 32B provides a wired connection in an exemplary embodiment to the keypad terminal that powers the operation of the keypad terminal 22. The network interface 34 provides a connection to a communication network or to a gateway that can provide communication with a communication network 14. In an exemplary embodiment, the network interface 34 is a phone connection, but may also in alternative embodiments be an ethernet connection, or any other similar connection that provides for connectivity with a communication network 14. The processor 35 controls the processing operations of the POS terminal 12. The memory store 36 provides memory storage that stores the security application 38. The security application 38 monitors the transactions that are processed by the POS terminal and transmits transaction data, monitors the security parameters, as well as restricts access to the POS terminals when certain security parameters have been detected and/or when particular activity or pattern of activities are deemed to have occurred. The peripheral devices 38 of the POS terminal allow for connectivity with devices such as printers, memory devices, monitors and other such devices.

Reference is now made to FIG. 2C, where the components of the keypad terminal 22 are shown in an exemplary embodiment. The keypad terminal 22 may comprise a card reader 40, a power and connectivity interface 42, and a keypad 44. The card reader 40 may be used where the customer is required, or wishes to, swipe their transaction card themselves as opposed to having their transaction card swiped, inserted or otherwise read by the merchant using the base station 20. Where the transaction card handling is done by the customer, the merchant would then upon the base station keypad 31 enter information related to the amount of the transaction, and where appropriate the customer would then enter their authentication information upon the base station keypad terminal 40. The power and connectivity interface in an exemplary embodiment is one connection that is provided from the base station, where the base station powers the keypad terminal and connects through a USB connection in an exemplary embodiment. In alternative embodiments, the power and connectivity interfaces may be separate components and/or via other types of connections.

Figure 3:
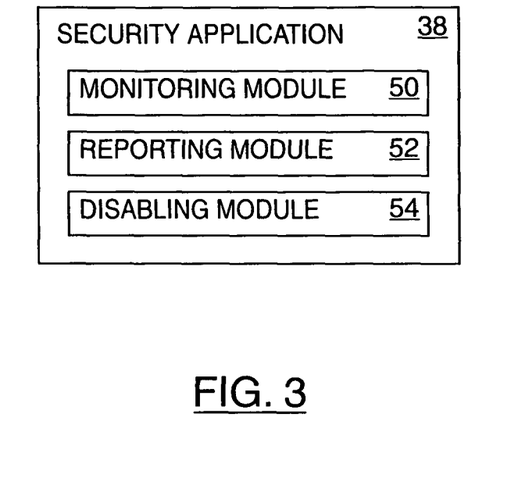
FIG. 3 is a block diagram of the components of the security application.

Reference is now made to FIG. 3, where the components of the security application 38 are illustrated in greater detail. The security application 38 allows for monitoring of the security parameters. The security application 38 in an exemplary embodiment comprises a monitoring module 50, a reporting module 52 and the security module 54. The operation of the various components of the security application 39 is described in further detail with regards to FIG. 7. The monitoring module 50 monitors the various security parameters that the monitoring module is adapted to search for. The reporting module 52 may transmit data related to the security parameters at set instances of time (i.e. when the device is powered down by an authorized user and at power up which will likely coincide with opening and closing times), and/or in real time with the detection of a violation of a security parameter (where a security parameter has been flagged as having been compromised). The disabling module 54 may receive instructions from the terminal management server 16 to restrict access to the terminal 12 based on the processing of transaction data 13 that has indicated that the terminal may have been compromised. Also, the disabling module in alternative embodiments upon the detection of a security event by the monitoring module may deactivate the terminal so that it can only be operated after an override authentication code has been entered.

Figure 4:
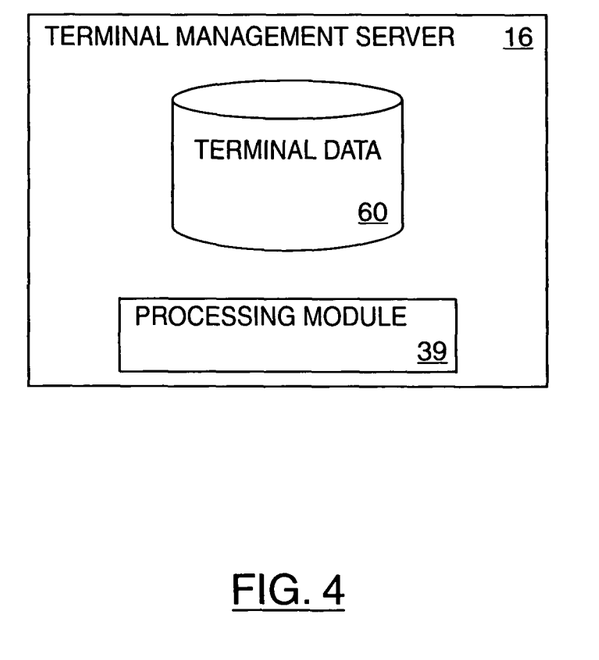
FIG. 4 is a block diagram of the components of the terminal management server.

Reference is now made to FIG. 4, where a block diagram illustrating the components of the terminal management system 16 is shown in one embodiment. The terminal management server 16 in one embodiment comprises a terminal database 60 and a processing module 62. The management server comprises further processing capabilities through its use of conventional transmitters and receivers, transmitters, processors and storage mediums. The terminal management server 16 in an exemplary embodiment may be any server type computing device. The terminal database 60 can be used to store terminal and transaction data and security parameter data transmitted from the POS terminals. An exemplary embodiment of the terminal database 60 is illustrated in further detail with regards to FIG. 6. The processing module 62 allows for the users of the system 10 to specify the variables associated with the security parameters that may be used to dictate whether security alerts originate from the POS terminals 12. The variables allow for acceptable timing thresholds to be established by which determinations of whether violations of security parameters have taken place can be made.

The processing module 60 as described below can also process the transaction data to determine whether terminal 12 has been compromised.

Figure 5:
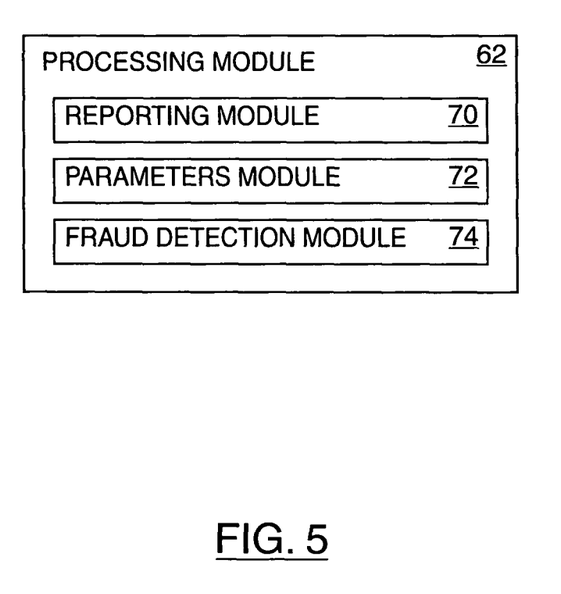
FIG. 5 is a block diagram of the components of a processing module.

Reference is now made to FIG. 5, where the components of the processing module 62 are illustrated in greater detail. The processing module 62 comprises various modules that are described for purposes of this application as separate modules, however it will be understood that the respective modules described herein, may be combined to represent one module. In an exemplary embodiment the security module 62 is comprised of a reporting module 70, a security variable module 72 and a fraud detection module 74. The reporting module as is described with reference to FIG. 9 allows the users of the system 10 to view reports related to the use of the POS terminal system 10, particularly with respect to any security events associated with the POS system 10. The security variable module 72 allows the users of the system 10, to determine variables associated with the security parameters that will determine whether a security alert has occurred. For example, if the merchant determines that the threshold for a security event associated with the power connectivity of the terminal 12 is to be 10 seconds, where the power is removed or otherwise disconnected from the POS terminal 12 for less than 10 seconds this will not be flagged as a flagged security event, though this data may still be transmitted to the terminal management server 16 that can log and/or otherwise process this data as described below to determine whether this incident may fit a pattern that would can trigger a flag indicating that the terminal may have been compromised or has been removed for any period of time. The fraud detection module 74 processes the terminal data and with its processing it can highlight and determine whether incidents of fraud are being perpetrated through compromising of the POS terminal 12. The fraud detection module 74 in an exemplary embodiment is described herein as monitoring various security parameters associated with the terminal. The security parameters are any feature of the terminal that can be monitored, such that any violations of the security parameters can be reported through use of the system 10. Violations may be recorded where an allowable time has been exceeded or where a security parameter has been flagged. Further, checks can be performed with regards to the state of the security parameters at specific instances of time. For example, checks that ensure that no terminal power downs have taken place at a certain time or during a certain period of time, may also be performed and used to determine whether any specific instances of fraud have been detected and where they have detected a violation. As an example, the system 10 may classify as violations all instances of the detection of a reboot of a terminal 10 outside of a pre-specified set of business hours. When detecting or reporting on security parameters, additional information can also be provided from the terminal 10, including information regarding any identifications used by operators of the terminal both before and after a violation of a security parameter has been detected, and serial numbers of the respective components of the terminals. This additional information may also be used in the processing of the data to detect whether a violation has occurred or where further follow up is required.

Figure 6:
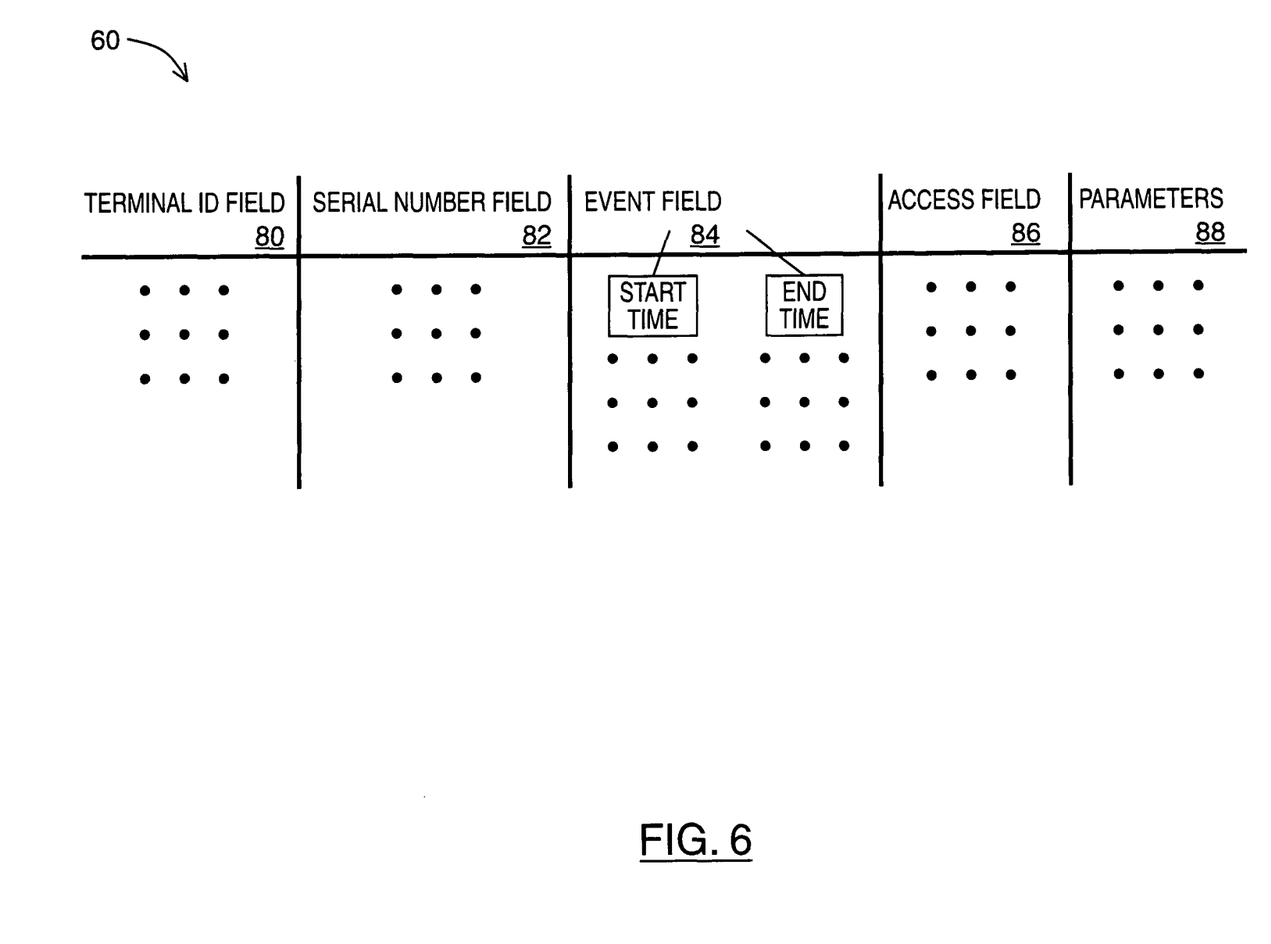
FIG. 6 is a block diagram of the fields of the terminal database.

Reference is now made to FIG. 6, where the fields of the terminal database 60 are illustrated in greater detail in one embodiment. The database 60 allows for the processing module 70 and the fraud detection module 74 to access data as required to perform their respective functions. The terminal database 60 in one embodiment comprises a terminal ID field 80, a serial number field 82, an event field 84, an access field 86, and a parameters field. The terminal ID field 80 stores an unique terminal identifier that is assigned to each POS terminal 12. The serial number field 82 stores the serial number of the POS terminal, including both the serial number for the POS terminal 12 and a serial number that may be assigned to the keypad. The events field 84 stores the security event data along with the start time 84A and end time 84B (where applicable associated with each security event) of the event. The events fields 84 allows the terminal management system to track and report on the security events associated with each terminal 12 that is part of the terminal management system 10. The access field 86 contains a flag that is used to determine whether the POS terminal 12 has been deactivated or locked as a result of any suspected instances of tampering. Where a flag indicates that the suspected instances of tampering may have occurred, the POS terminal 12 in one embodiment may be locked out such that the terminal 12 may not be used until an authorization code associated with the POS terminal 12 is entered by an authorized user. The parameters field 88 comprises parameter settings that determine whether a security event has occurred.

Figure 7:
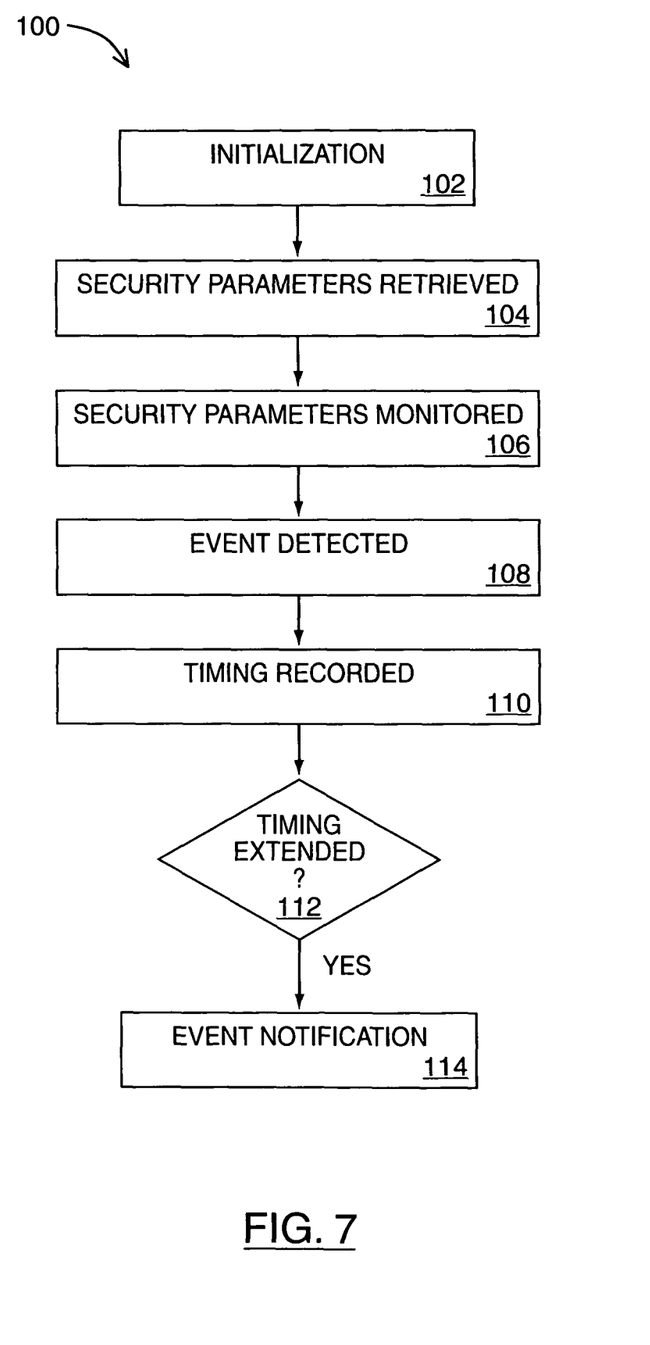
FIG. 7 is a flowchart illustrating the steps of a monitoring method security.

Reference is now made to FIG. 7, where a flowchart illustrating the steps of a monitoring method 100 is shown in one embodiment. The monitoring method 100 monitors the POS terminal to determine whether a security event has occurred and appropriately reports that security event to the terminal management server 16. The monitoring method 100 can operate continuously upon each of the POS terminals 12. Method 100 begins at step 102, where the POS terminal 12 is initialized. During the initialization process, the terminal 12 provides the serial number and terminal identification number. Method 100 then proceeds to step 104, where the variables associated with the security parameters are retrieved from the terminal management server 16. Method 100 then proceeds to step 106, where the various components or connections associated with the security parameters are monitored. Upon the detection of a security event, such as for example where a security event is indicative of a disconnect having been detected, method 100 proceeds to step 110, where the timing of the security event is recorded. Method 100 then proceeds to step 112, where the end timing of the security event may be recorded (e.g. the time at which connectivity is restored). Method 100 then proceeds to step 112, where a check is performed to determine whether a flagged security event has occurred. The check performed at step 112 determines whether the security parameter timing has been exceeded. Where it is determined that the timing has been exceeded, the security event is characterized as a flagged security event. Where a flagged security event has been detected, method 100 then proceeds to step 114, where the terminal management server 16 is notified of the occurrence of a flagged security event. Upon informing the terminal management server of the occurrence of a flagged security event, method 100 returns to step 106, where the POS terminal 12 is monitored for the occurrence of any other security event. The security events for purposes of this example have been described as those that have an allowable elapsed time associated with them. It should be understood that the operation of the system 10 is not limited to such instances and that a flagged security event may be generated upon the detection of any disconnect without the requirement that a certain amount of time pass.

Figure 8:
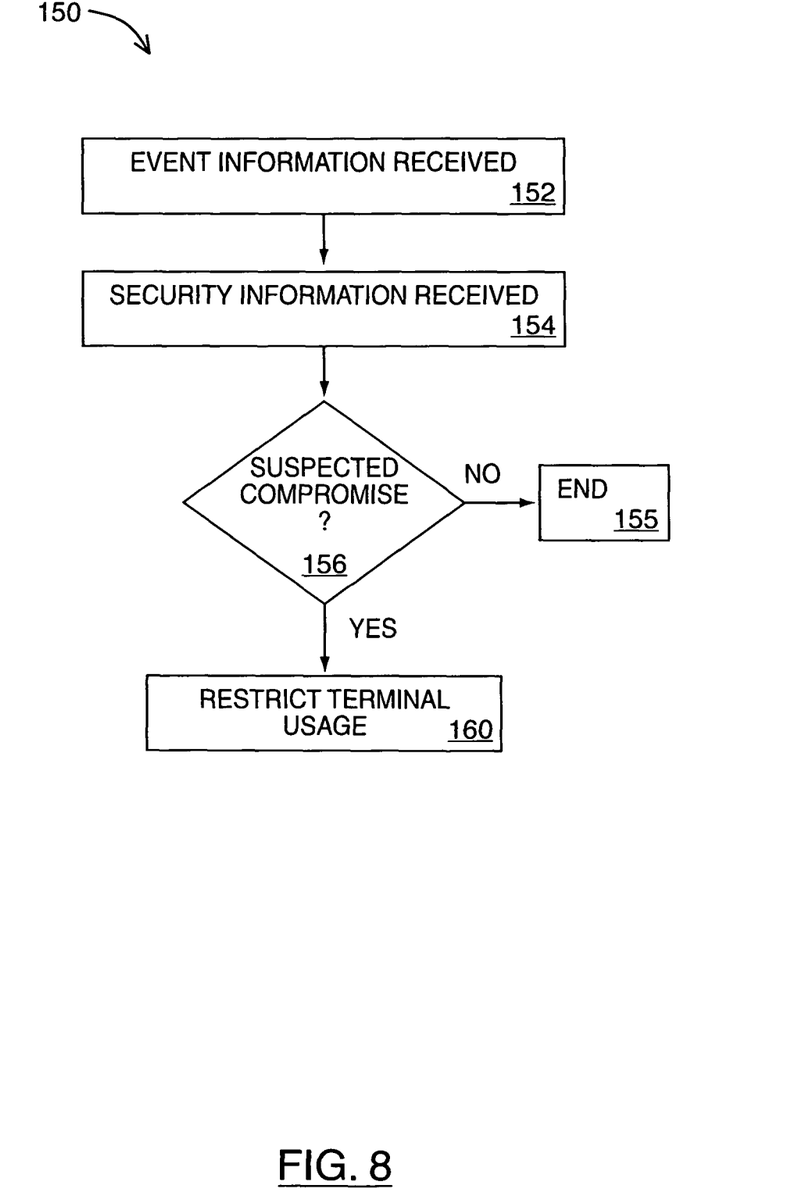
FIG. 8 is a flowchart illustrating the steps of an event processing method.

Reference is now made to FIG. 8, where a flowchart illustrating the steps of a security parameter processing method 150 is shown in one embodiment. The security parameter processing method 150 is used to process security parameter data that is transmitted from the respective point of sale terminals. The security parameter processing method 150 is executed to secure the POS terminal 12 to prevent use of the POS terminal where a suspected case of tampering of the POS terminal 12 exists. Method 150 begins at step 152, where data regarding violation of a security parameter is received. As described above, flagged security event data can be received where the security parameters associated with the POS terminal are being been monitored and, for example, it has been determined that a disconnect of one or more components or connections has been determined (that may exceed an acceptable period of time). Where information has been provided that a component or connection may have been disconnected, the system 10 can factor into account that the disconnection may have been inadvertent or accidental, or system 10 can determine that it has been perpetrated deliberately and that the POS terminal 12 may be compromised. Therefore, method 150 then proceeds to step 154 and security information is retrieved. The security information determines where the occurrence of a detected violation of a security parameter should lead to access to the terminal being restricted and whether the merchant should be sent an electronic notice regarding the potential compromise of the POS terminal 12. Method 150 then proceeds to step 156 where a check is performed to determine whether the violation of a security parameter indicates that the POS terminal 12 may have been compromised. Optionally, the violation may be categorized to indicate a severity level, where a security event may be flagged as a low, medium or high level violation. If it is determined at step 156 that POS terminal may have been compromised, method 156 proceeds to step 160 where the use of the POS terminal may be restricted in that it may not process transactions, or that only certain functions or transactions are performed (such as, for example, for transactions of particular dollar amounts or less). Additionally, an electronic notification may be sent to one or more authorized individuals associated with the merchant to inform them of the flagged security event. Such a notification would allow a merchant to inspect the device and make a determination as to whether the device has been compromised thus potentially averting fraudulent activity that may have taken place as a result of the compromised terminal.

Figure 9:
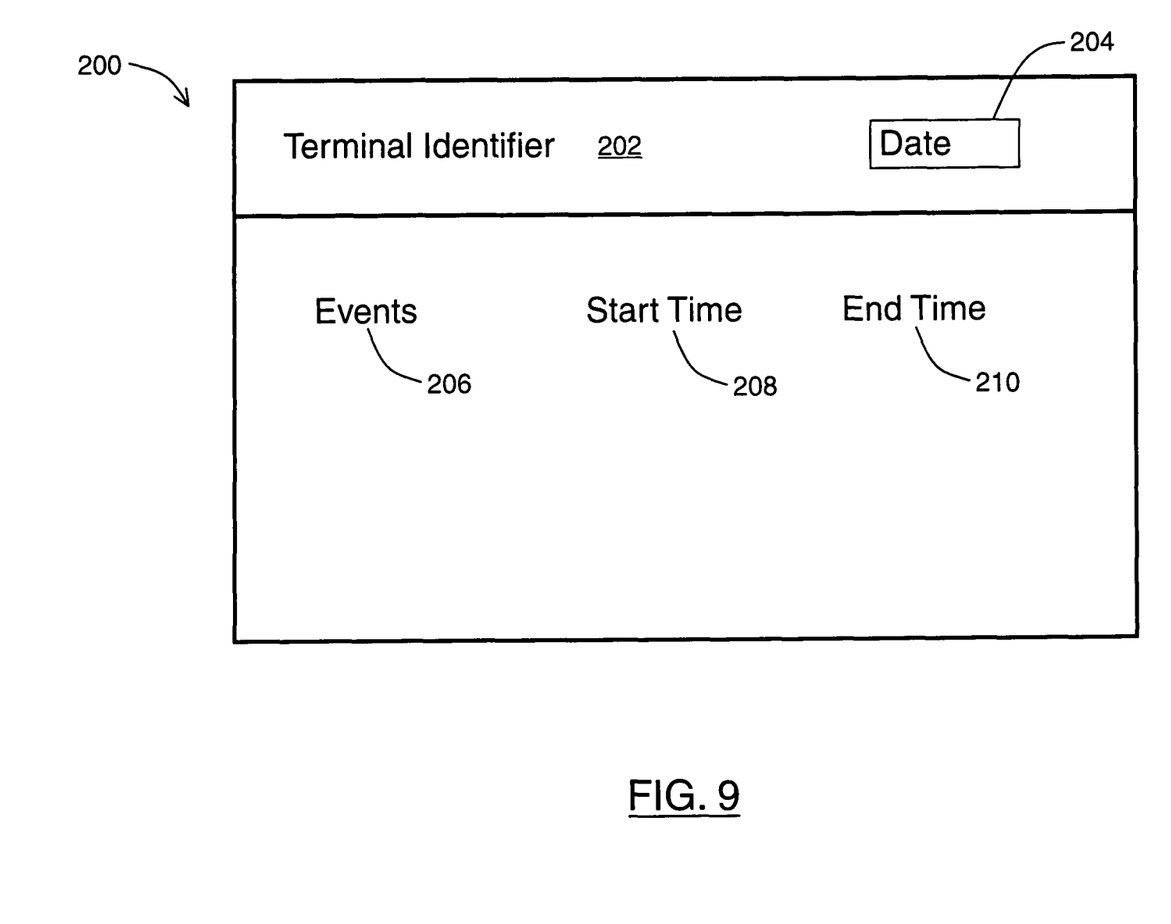
FIG. 9 is a sample screenshot of a terminal report screen.
Figure 10:
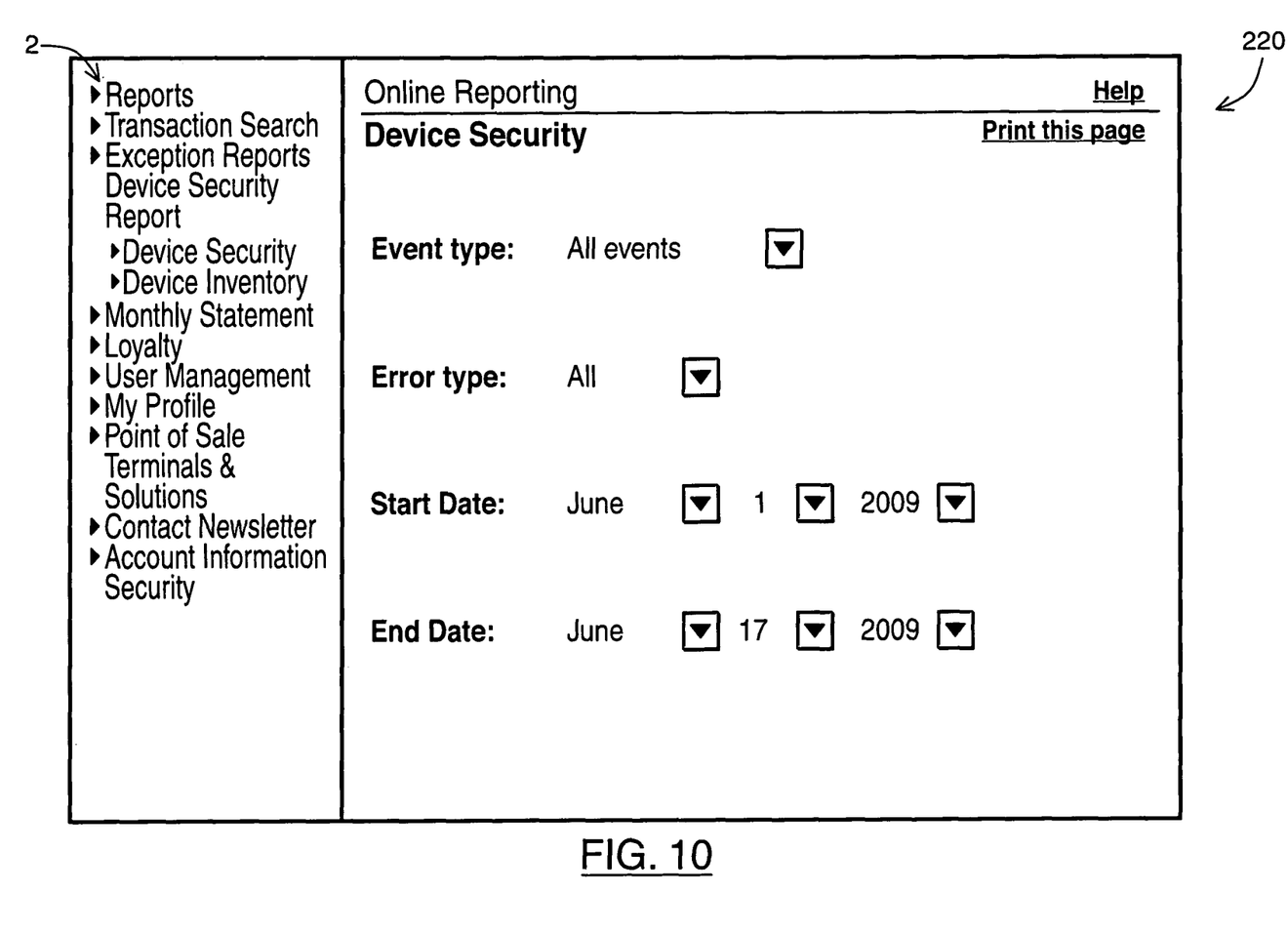
Figure 11:
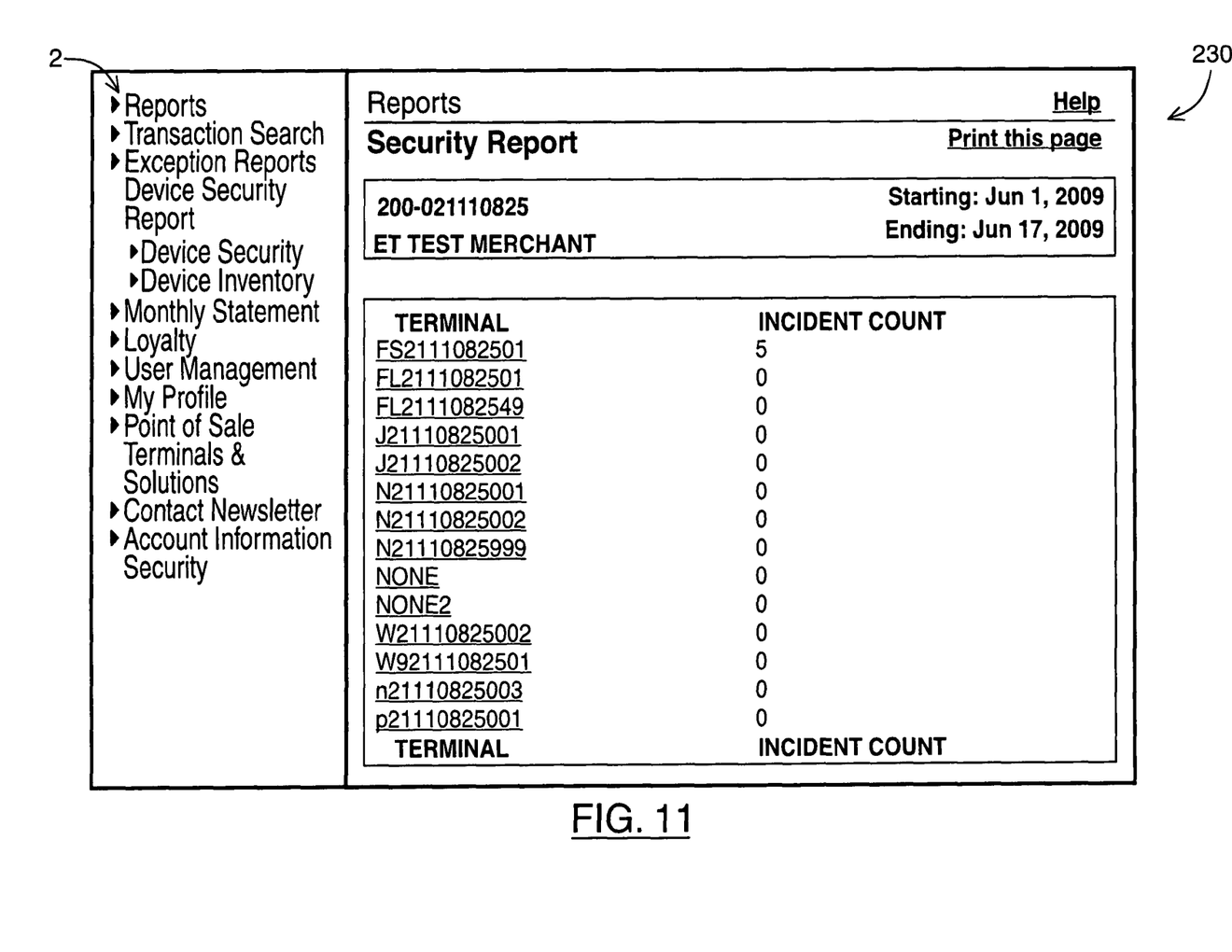
Figure 12:
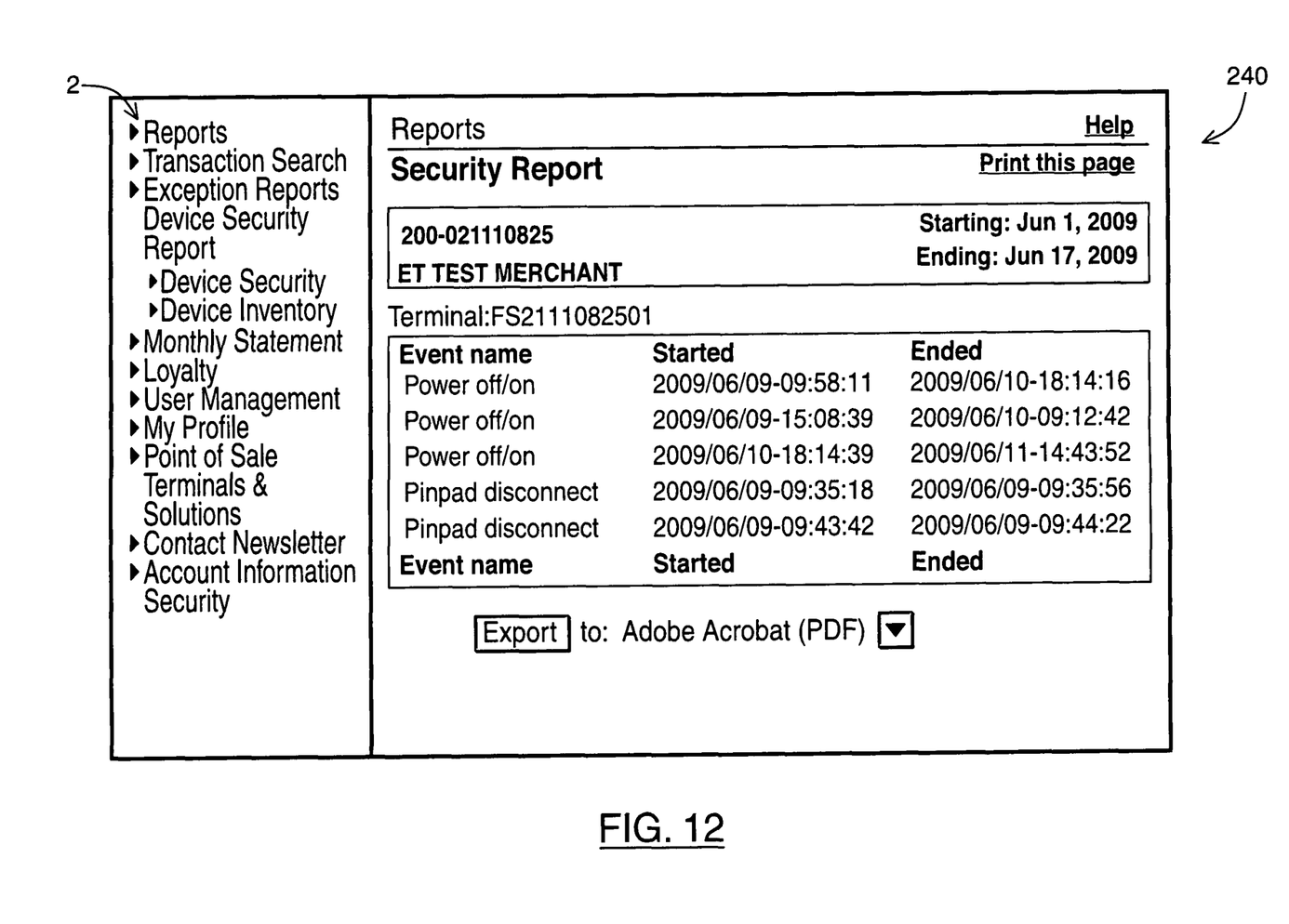

Reference is now made to FIG. 9, where a sample screen shot of a report generation window 200 is shown in an exemplary embodiment. The report generation window 200 provides an example of the functionality that is presented to the user with regards to reviewing the security events associated with a specific POS terminal 12. FIGS. 10-12 further describe the functionality that is present in the system 10, with reference to the reports that may be requested by and generated for, a user. As will be understood by one of ordinary skill in the art, the sample report window shown in FIG. 9 is meant to provide an example of the types of reports that may be generated. Report generation window 200 in one embodiment comprises a terminal identifier field 202, a date field 204, an events field 206, and start time and end time fields 208 and 210 respectively. The terminal identifier field will display the unique terminal id that is associated with the terminal 12 that will allow the merchant to appropriately identify the terminal. The date field 204 stores date information with regards to the dates associated with the report. The events field 206 displays information regarding the various flagged security events that took place between the dates specified in the date field, and where appropriate the length or duration associated with the flagged security events are specified in the respective start and end time date fields 208 and 210 respectively.

Reference is now made to FIG. 10, where a sample report request window 220 is shown in one embodiment. The request window 220 allows a user to request specific reports, though use of the security report menu 222. For purposes of example, window 220 is shown where the user has chosen to request a device security report. The device security report allows the user to request a report based on the various types of security parameters that are monitored, and allows for a date range to be specified. Additional reports that may be requested, include but are not limited to, device inventory reports and exception reports. The exception reports provide the user with specific information with regards to security parameters that have been monitored. The device inventory reports will specify for each device a history of the monitoring that has taken place. For purposes of describing the functionality associated with the report generating functions, figures that further describe the device security report are shown in FIGS. 11 and 12. Reference is now made to FIG. 11, where a sample of a device security report window 230 is shown. The device security report window 230 in an exemplary embodiment provides the user with a report where based on each terminal that is being monitored, the number of violation that have been detected for each terminal. For each terminal, where the user desires to obtain more information for a specific terminal, the user can select the specific terminal they require more information regarding. Reference is now made to FIG. 12, where a terminal incident report 240 is shown in one embodiment. The terminal incident report is generated for a terminal based on a user selection, where the user requires more information regarding a specific terminal. In an exemplary embodiment, the terminal incident report 240 generates a detailed report regarding the security parameter violations that were detected for a specific terminal, including where applicable their duration (or timing of incident detection where the duration is not applicable).

While the foregoing invention has been described in some detail for purposes of clarity and understanding, it will be appreciated by those skilled in the relevant arts, once they have been made familiar with this disclosure, that various changes in form and detail can be made without departing from the true scope of the invention in the appended claims. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described.

The invention claimed is:

1. A method for monitoring security of a point-of-sale terminal, the method comprising:
   (a) the point-of-sale terminal monitoring one or more security parameters associated with the point-of-sale terminal, a violation of any one of the security parameters being indicative of a compromise of the point-of-sale terminal;
   (b) the point-of-sale terminal detecting any violation of any one of the security parameters,
   (c) the point-of-sale terminal classifying the detected any violation of the one or more of the security parameters into a classification;
   (d) the point-of-sale terminal transmitting data regarding the any violation of the one or more of the security parameters, including the classification thereof, to a terminal management server; and
   (e) in response to the terminal management server classifying the any detected violation of the one or more of the security parameters as potential fraudulent activity, the point-of-sale terminal receiving from the terminal management server a command disabling functionality of the point-of-sale terminal, wherein the one or more security parameters includes a power status of the point-of-sale terminal, and the detecting any violation of the any one of the security parameters includes the point-of-sale terminal detecting at least a power-up event at the point-of-sale terminal.

2. The method of claim 1, wherein the one or more security parameters further include a network connectivity status of the point-of-sale terminal, the point-of-sale terminal maintains a network connection with the terminal management server, and the detecting any violation of the any one of the security parameters further includes the point-of-sale terminal detecting a termination of the network connection.

3. The method of claim 1, wherein the one or more security parameters further include monitoring an access door to interior components of the point-of-sale terminal, and the detecting of any violation of the any one of the security parameters further includes the point-of-sale terminal detecting an opening of the access door.

4. A terminal management server for processing security event data of a point-of-sale terminal, the server comprising
a data transceiver configured to receive from a point-of-sale terminal the security event data indicative of a security violation detected at the point-of-sale terminal, the detected security violation being indicative of a compromise of the point-of-sale terminal; and
a data processor in communication with the data transceiver and configured to classify the detected security violation as potential fraudulent activity, and to cause the data transceiver to send a command to the point-of-sale terminal disabling functionality of the point-of-sale terminal,
wherein the detected security violation includes at least a power-up event at the point-of-sale terminal.

5. The terminal management server of claim 4, wherein the terminal management server is configured to maintain a network connection to the point-of-sale terminal, and the detected security violation includes a termination of the network connection.

6. The terminal management server of claim 4, wherein the data processor is further configured to cause the data transceiver to send a notification of the security violation, wherein the notification of the security violation is provided by at least one of an electronic mail and a SMS message to one or more recipients.

7. The terminal management server of claim 4, further comprising a data storage medium in communication with the data processor and storing an expected time instant for an authorized power-up event, and the terminal management server is configured to classify the detected security violation as potential fraudulent activity from a comparison of a time instant of the power-up event at the point-of-sale terminal with the expected time instant for the authorized power-up event.

8. The terminal management server of claim 7, wherein the data storage medium further stores an expected time instant for an authorized power-down event, the detected security violation includes a power-down event at the point-of-sale terminal, and the terminal management server is configured to classify the detected security violation as potential fraudulent activity from a comparison of a time instant of the power-down event at the point-of-sale terminal with the expected time instant for the authorized power-down event.

9. The terminal management server of claim 5, further comprising a data storage medium in communication with the data processor and storing an expected time instant for an authorized network reconnection, the detected security violation includes a restoration of the network connection at the point-of-sale terminal, and the terminal management server is configured to classify the detected security violation as potential fraudulent activity from a comparison of a time instant of the restoration of the network connection with the expected time instant for the authorized network reconnection.

10. The terminal management server of claim 4, wherein the detected security violation includes opening of an access door to interior components of the point-of-sale terminal.

11. The terminal management server of claim 4, wherein the detected security violation includes removal of an internal component from the point-of-sale terminal.

12. The terminal management server of claim 4, wherein the detected security violation includes tampering of an external casing of the point-of-sale terminal.

13. The terminal management server of claim 4, wherein the command disabling functionality commands the point-of-sale terminal to discontinue processing of payment transactions at the point-of-sale terminal until an override authentication code is entered into the point-of-sale terminal.

14. The terminal management server of claim 4, wherein the command disabling functionality commands the point-of-sale terminal to discontinue processing of payment transactions at the point-of-sale terminal above a set monetary amount.

15. The method of claim 1, wherein the point-of-sale terminal transmitting data comprises the point-of-sale terminal transmitting a time instant of the power-up event at the point-of-sale terminal.

16. The method of claim 15, wherein the point-of-sale terminal transmitting data further comprises the point-of-sale terminal transmitting a time instant of a power-down event at the point-of-sale terminal.

17. The method of claim 1, wherein the detecting of any violation of the any one of the security parameters includes the point-of-sale terminal detecting removal of an internal component from the point-of-sale terminal.

18. The method of claim 1, wherein the detecting of any violation of the any one of the security parameters includes the point-of-sale terminal detecting tampering of an external casing of the point-of-sale terminal.

19. The method of claim 1, wherein the point-of-sale terminal transmitting data comprises the point-of-sale terminal transmitting the data when the point-of-sale terminal is powered down by an authorized user and/or when the point-of-sale terminal is powered up.

20. The method of claim 1, wherein the point-of-sale terminal transmitting data comprises the point-of-sale terminal transmitting the data in real time with the point-of-sale terminal detecting the any violation of the one or more security parameters.

21. The method of claim 1, wherein the point-of-sale terminal transmitting data comprises the point-of-sale terminal transmitting transaction data to the terminal management server, the transaction data comprising data generated by the point-of-sale terminal based on a payment transaction and the data regarding the any violation of the one or more of the security parameters.

22. The method of claim 1, wherein the command disabling functionality indicates the point-of-sale terminal is to be deactivated, and in response to the command disabling functionality the point-of-sale terminal discontinues processing of payment transactions at the point-of-sale terminal until an override authentication code is entered into the point-of-sale terminal.

23. The method of claim 1, wherein the command disabling functionality indicates the point-of-sale terminal is to be deactivated, and in response to the command disabling functionality the point-of-sale terminal discontinues processing of payment transactions at the point-of-sale terminal above a set monetary amount.

\* \* \* \* \*